Oct. 31, 1944.                O. S. PETTY                2,361,648
                            SEISMIC SURVEYING
                           Filed May 15, 1940
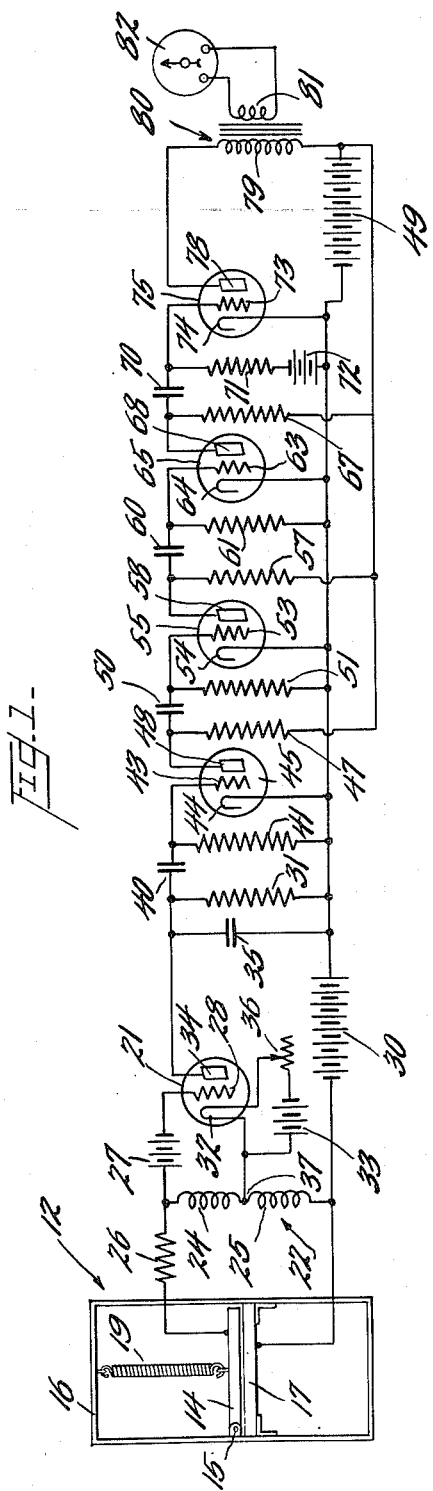
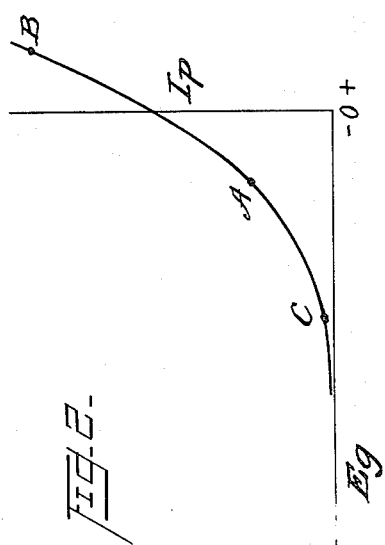
Inventor
Olive S. Petty
By Watson, Cole, Grindle & Watson
                              Attorney

UNITED STATES PATENT OFFICE 2,361,648

SEISMIC SURVEYING

Olive S. Petty, San Antonio, Tex.

Application May 15, 1940, Serial No. 335,388

2 Claims. (Cl. 177—352)

This invention relates to methods of and apparatus for conducting seismic surveys for use in connection with geophysical prospecting, and more particularly to apparatus and methods for recording the seismic wave trains as they arrive at any particular station.

It is a general object of the present invention to provide novel and improved apparatus for and methods of recording the arrival times of waves which are received over a period of several seconds and exhibit during that time various intensities or amplitudes, the ratio of the highest to the lowest amplitude being relatively large.

Thus it is well recognized that certain higher energy waves may be received with an intensity of the order of 600 times as great as certain other waves, and it is also noted that during a period following the reception of waves of high amplitude, the wave form energy is gradually attenuated over an appreciable period, usually decaying rather uniformly with time. Thus in order that waves of widely varying amplitude may all be received and recorded by sensitive apparatus on a record sheet or other medium of convenient dimensions, it is highly essential that some means be provided to bring the waves, or the energy derived therefrom to levels not greatly differing throughout the total time of wave reception.

With this end in view, it is an object of the instant invention to provide means responsive to the arrival of wave energy of high amplitude for reducing the level at which such energy is recorded, for example, by reducing the sensitivity of the apparatus. It is a further object of the invention to gradually increase the level at which the energy is recorded during the periods of attenuation or decay of the wave trains. A feature of the instant invention resides in the fact that both of these objects may be achieved by the use of the same devices, these devices serving to provide greatly reduced sensitivity in the apparatus on the arrival of seismic waves of large amplitude, followed by a period of gradually increasing sensitivity to compensate for decay, and thereby to provide a record of usable level.

Preferably the arrangement is such that the extent to which the sensitivity of the apparatus may be varied, as well as the period during which gradual increase in sensitivity is effected, may be predetermined with reasonable accuracy.

More specifically, it is an object of the invention to provide, in apparatus of the character described and in association with a seismometer or other device for converting seismic impulses into electrical wave form energy, an amplifier for such converted energy, the degree of amplification effected in such amplifier being automatically regulated in response to the arrival of the seismic waves in the manner hereinbefore indicated.

Still a further object of the invention is to provide an amplifier for electrical wave form signals derived from a seismometer or like device having at least one resistance coupled amplifier stage in which the constants are so selected that on the arrival of signals of high amplitude, the grid of a thermionic valve associated with such stage is driven positive and accumulates an excess of electrons so as to partially or completely block the same, and thereby to reduce materially the gain in that stage, the constants further being such that the negative grid charge is drained away gradually and over a predetermined period of time to compensate for attenuation or decay of later received seismic impulses. In a preferred form, the invention is applied to several resistance coupled amplifying stages, whereby the rate of variation of amplification of the signals may be more readily adjusted and the range of variation may be broadened.

Further objects and features of the invention will be apparent from the following description taken in connection with the accompanying drawing, in which Figure 1 is a circuit diagram of an amplifier for wave form electrical signals to which the invention has been applied; and Figure 2 is a characteristic curve of one of the valves in the amplifier illustrated in Figure 1.

In order to facilitate an understanding of the invention, reference will be made to the several embodiments thereof illustrated in the accompanying drawing and specific language will be employed. It will nevertheless be understood that various further modifications of the devices illustrated herein, such as would fall within the province of those skilled in the art to construct are contemplated as part of the present invention.

Referring first to Figure 1, it will be observed that the reference character 12 indicates generally a diagrammatic representation of a detector unit or seismometer of the so-called capacitive type, the essential elements of which comprise a movable plate 14, which may be hingedly supported at 15 on the casing 16, and a plate 17 which is fixed in the casing. A spring 19 is connected between the movable plate 14 and the upper portion of the casing 16, and constitutes with the plate 14 an elastic system, the plate being permitted to swing about its point of pivotal support toward and away from the fixed plate 17, whereby the two plates function as a condenser of which the capacity is varied on vertical displacement of the casing 13.

It will be appreciated that the details of the structure thus far described form no part of the instant invention, and that the showing is wholly diagrammatic. Any suitable form of seismometer may be employed for the purpose. For example, the seismometer may be constructed in accordance with that disclosed in my prior application Serial No. 324,013, filed March 14, 1940, now abandoned, or my prior application Serial No. 318,739, filed February 13, 1940, now Patent No. 2,348,225 dated May 9, 1944, the latter disclosing a magnetic type of seismometer.

The plates 14 and 17 are incorporated in the oscillating circuit of a three-element thermionic valve 21, the circuit also including an intermediate tapped inductance coil 22 having a portion 24 which may be described as a grid winding and a portion 25 which may be described as an anode winding. The grid winding 24 is electrically connected at its outer end through resistance 26 with plate 14 and is further connected through grid bias battery 27 to the grid 28 of the valve 21. The outer end of the anode winding 25 is electrically connected to the plate 17 and is further connected through a source of anode voltage 30 and an anode resistor 31 to the anode 34 of the valve 21. A condenser 35 is connected between the valve anode 34 and the outer end of the anode winding 25 to afford a path for pulsating current. The filament 32 of the valve is heated from a source 33 controlled by a rheostat 36 and is connected to the intermediate tap 37 of the coil 22.

It will be appreciated that the circuit just described will oscillate at a frequency which is dependent upon the characteristics of the various elements included in the circuit. The inductance of the two parts of the coil 22, the value of the resistance 26, condenser 35, and other parts of the circuit are appropriately selected to provide a convenient resonance frequency for any desired spacing of the plates 14 and 17. Means may be provided to adjust the spacing between these plates to afford the desired frequency of oscillation, so that thereafter, with all of the other elements of the circuit remaining constant, any variation in the spacing of the plates will cause corresponding changes in the oscillation frequencies. When the plates are in repose, the output of the circuit is a fixed high frequency pulsating direct current from the source 30 to the anode 34, and there is present in the grid winding 24 a high frequency alternating current of fixed amplitude. The changes in frequency of oscillation brought about by relative movement of the plates 14 and 17 alters the quantity of current flowing to the plate of the tube as more particularly described in my application Serial No. 324,013, hereinbefore referred to.

No especial significance attaches to the details of the oscillating circuit just described, it being contemplated that various modifications and alterations therein may be effected as desired, having in mind the type of seismometer which is employed.

In the preferred embodiment of the invention illustrated herein, the output of the oscillating circuit including the valve 21 is amplified in one or more resistance coupled stages. Thus the first coupling circuit may include the anode resistor 31, hereinbefore referred to, a coupling condenser 40 and a grid resistor 41, the latter being connected between the grid 43 and cathode 44 of a thermionic valve 45, the arrangement of these elements in the circuit being conventional. Similarly, an anode resistor 47 serves to deliver voltage to the anode 48 from a source of supply 49. A coupling condenser 50 connects anode 48 to grid 53 of the valve 55 in the succeeding stage, a grid resistor 51 being connected between the grid 53 and the cathode 54 of the valve 55.

Two further resistance coupled stages are illustrated, these stages being similar to those already described. Thus the anode 58 of valve 55 is supplied with anode voltage from the source 49 through the anode resistor 57. A coupling condenser 60 connects anode 58 to grid 63 of the valve 65 in the succeeding stage, a grid resistor 61 being connected between the grid 63 and the cathode 64 of the valve 65. Anode 68 of valve 65 is supplied with anode voltage from the source 49 through an anode resistor 67, and a coupling condenser 70 connects anode 68 with grid 73 of the succeeding valve 75, a grid resistor 71 and a source of grid bias voltage 72 connecting the grid 73 with the cathode 74.

The output of the valve 75 may be delivered to any conventional form of indicating or recording mechanism. For example, this output may be delivered to a transformer for supplying alternating current to a vibrating string of a galvanometer of the multiple string type. In the drawing, the anode 78 of the valve 75 is connected to the anode voltage source 49 through the primary winding 79 of a transformer 80. The secondary winding 81 of the transformer is connected to the terminals of a recording device, represented at 82 by the conventional galvanometer symbol. The details of this recording device form no part of the instant invention, it being obvious that the nature of this device may vary widely.

In the practice of the invention, the desired result of varying the sensitivity or the degree of amplification effected by the circuit hereinbefore described is achieved by suitable selection of constants for the circuit, and more particularly by the selection of appropriate values for the coupling condenser and the grid resistor in one or more of the amplifying stages. For example, if the coupling condenser 40 of the first stage has a relatively high capacity, a signal of high amplitude will charge this condenser and apply to the grid 43 of the valve 45 a strong negative bias, whereby the valve will be partially or completely blocked. The value of the grid resistor 41 is so selected that the charge on the condenser 40 leaks off relatively slowly, thereby permitting the valve gradually to return to the normal operating condition, and effecting gradual increase in the amplification to compensate for attenuation or decay of the signal. The selection of these constants may be effected either experimentally or by computation.

Thus it can be shown that the period required to drain the voltage on the coupling condenser to approximately 36.2% of the initial value may be determined roughly from the formula $RC=T$, where R is the resistance of the grid resistor in megohms, C is the capacity of the coupling condenser in microfarads, and T is the time in seconds, assuming that the combined resistance of the valve anode and its coupling resistor, in parallel, is negligible in comparison to the value of the grid resistance. For example, if the capacity of coupling condenser 40 is 2 mfd., and the resistance of the grid resistor 41 is 2 megohms (anode and coupling resistances being negligible), the drop in voltage across the condenser 40 following the arrival of high amplitude energy to about 36.2% of the initial value will require 4 seconds. In general, it is found that satisfactory results are achieved by the establishment of a time delay constant of from one-half second to three or four seconds for most seismic work, but the time required to discharge the coupling condenser may be extended outside of this range to obtain any desired effect. I prefer to employ constants such that the drop of voltage across the coupling condenser to approximately 36.2% of the initial value following the arrival of high intensity seismic waves is of the order of two seconds.

It will be appreciated that the ability of the amplifier to deal properly with signals derived from seismic impulses of widely varying nature may be increased by the establishment of suitable constants in more than one of the amplifying stages, the gradual increase in the degree of amplification following the passage of a signal of high amplitude extending over different periods of time in the several stages, so as to establish approximately the correct over-all amplification. By way of example, one such amplifier which was operated successfully employed a value of 2 mfd. for the coupling condensers 40, 50, 60, and 70, and values for the grid resistors 41, 51, 61, and 71, of 3, 2, 1, and ½ megohms respectively. Obviously these values are not critical and may be varied widely.

The function of the individual valves in maintaining a suitable amplitude level at the recorder, regardless of widely varying amplitude of the received signal, may be readily understood from an inspection of Figure 2 of the drawing. This figure represents a characteristic $E_g - I_p$ curve, the grid voltages being plotted as abscissae and the corresponding plate currents as ordinates. The valve may be initially biased so as to operate substantially at the point A, either with or without the aid of a source of grid bias voltage. Normal variation in amplitude of the incoming signal will effect a corresponding variation in the grid voltage, and the valve will thus function in the ordinary way to deliver a pulsating anode current. If, however, seismic impulses of high intensity arrive, the grid will be driven positive, for example to the point B on the upper or positive portion of the curve, and the grid current becomes quite large. This leaves an excess of electrons on the grid of the valve when the signal swings in the opposite direction, leaving the grid at a bias such as C, and since the tube has a variable mu, little or no variation of current in the anode circuit will occur in response to variation in grid potential, sensitivity of the apparatus being thus reduced to a minimum. As the voltage on the coupling condenser gradually discharges through the grid resistor, the operating point will move upwardly from C toward A, so as to restore gradually the normal amplification of the valve, thereby compensating for the signal attenuation following the arrival of the high intensity impulses.

It will be appreciated that by means of the present invention a very simple and effective method of automatic volume control for seismic apparatus is provided, since no circuits in addition to the usual amplifying circuits are required.

The lower threshold (or the size of the minimum energy) to cause the reduction of the gain of the amplifier is determined by the grid bias voltage applied to the various valves, and can be altered by varying these voltages.

In order that the grid of a valve may receive a net accumulation of electrons, the following condition must exist:

$$C\left(R_c + \frac{R_b R_p}{R_b + R_p}\right) > \left(\frac{R_b R_p}{R_b + R_p} + \frac{R_c R_{g2}}{R_c + R_{g2}}\right)C$$

where C is the capacity of a coupling condenser such as 50, $R_c$ is the resistance of the grid coupling resistor 51, $R_b$ is the resistance of the anode resistor 47, $R_p$ is the resistance of the anode of valve 45, and $R_{g2}$ is the resistance of the grid of valve 55.

The first term is the time required for about 63.8% of the charge to leak off the grid when the grid is negative or zero, on the assumption that $R_{g2}$ is very large under such conditions; the second term is the time required to charge the condenser. When the grid is driven positive, $R_{g2}$ approaches zero resistance and the second term is primarily $$\left(\frac{R_b R_p}{R_b + R_p}\right)C$$

All values of $R_p$ and $R_{g2}$ are instantaneous values. In other words, the circuit constants must be such that the time constant for the charge to leak off the condenser on negative or zero signal is greater than the time constant for charging the condenser on large positive signal swings, if a net charge can be left on the grid.

In the field of radio broadcast reception and in allied fields, on the contrary, most audio amplifiers and all high fidelity amplifiers must be constructed so as to establish the following condition:

$$C\left(R_c + \frac{R_b R_p}{R_b + R_p}\right) \leqq \left(\frac{R_b R_p}{R_b + R_p} + \frac{R_c R_{g2}}{R_c + R_{g2}}\right)C$$

and the usual condition is that the first term is very much smaller than the second term.

It will be apparent from the foregoing that the requirements for the practice of the instant invention may be easily supplied by the use of coupling condensers of high capacity and grid coupling resistors of high resistance value. The resistance of the anode resistor and of the anode are preferably small, but not necessarily so, and the resistance of the valve grid should be very small on large positive grid swings. Obviously the magnitude of the voltages which effect the necessary volume control can be altered by varying the resistance of the anode resistors, whereas the duration of application of the controlling voltage can be more readily varied by varying the value of the grid coupling resistors.

Having thus described the invention, what is claimed as new and desired to be secured by Letters Patent is:

1. A system for recording artificial seismic waves of varying amplitude on a record strip of limited uniform width comprising a seismometer for converting said seismic waves into electrical wave form energy, a thermionic valve amplifier for said electrical wave form energy, and a recorder operable by the output of said amplifier, said amplifier including at least one resistance coupled stage having a coupling condenser and a grid resistor, the capacity and resistance of said condenser and resistor respectively being such that the major portion of the charge impressed on said condenser by high amplitude waves is discharged through said resistor over a period of not substantially less than one-half second.

2. A system for recording artificial seismic waves of varying amplitude on a record strip of limited uniform width comprising a seismometer for converting said seismic waves into electrical wave form energy, a thermionic valve amplifier for said electrical wave form energy, and a recorder operable by the output of said amplifier, said amplifier including a plurality of resistance coupled thermionic valve stages, each such stage having a coupling condenser and a grid resistor, the capacity and resistance of said condenser and resistor respectively being such as to establish a time constant of the order of one-half second or more.

OLIVE S. PETTY.